(12) United States Patent
Laschinger

(10) Patent No.: US 10,552,447 B2
(45) Date of Patent: Feb. 4, 2020

(54) CONTEXT-AWARE COPYING OF MULTIDIMENSIONAL DATA CELLS

(71) Applicant: Christian Laschinger, Leimen (DE)

(72) Inventor: Christian Laschinger, Leimen (DE)

(73) Assignee: SAP SE, Walldorf (DE)

(*) Notice: Subject to any disclaimer, the term of this patent is extended or adjusted under 35 U.S.C. 154(b) by 951 days.

(21) Appl. No.: 14/546,071

(22) Filed: Nov. 18, 2014

(65) Prior Publication Data

US 2016/0140198 A1 May 19, 2016

(51) Int. Cl.
*G06F 16/27* (2019.01)
*G06F 16/28* (2019.01)

(52) U.S. Cl.
CPC ............ *G06F 16/27* (2019.01); *G06F 16/283* (2019.01)

(58) Field of Classification Search
CPC .................... G06F 17/30575; G06F 17/30592
See application file for complete search history.

(56) References Cited

U.S. PATENT DOCUMENTS

| 9,613,086 | B1* | 4/2017 | Sherman | G06F 17/30389 |
| 2001/0047355 | A1* | 11/2001 | Anwar | G06F 17/30395 |
| 2002/0049784 | A1* | 4/2002 | Bauchot | G06F 17/246 |
| | | | | 715/212 |
| 2006/0075353 | A1* | 4/2006 | DeSpain | G06F 17/24 |
| | | | | 715/770 |
| 2006/0282482 | A1* | 12/2006 | Castro | G06F 17/30575 |
| 2008/0313184 | A1* | 12/2008 | Li | G06F 17/30592 |
| 2009/0299955 | A1* | 12/2009 | Aski | G06F 17/30592 |
| 2011/0125705 | A1* | 5/2011 | Aski | G06F 8/30 |
| | | | | 707/602 |
| 2011/0258049 | A1* | 10/2011 | Ramer | G06F 17/30867 |
| | | | | 705/14.66 |
| 2013/0262501 | A1* | 10/2013 | Kuchmann-Beauger | |
| | | | | G06F 17/30958 |
| | | | | 707/769 |
| 2015/0006579 | A1* | 1/2015 | Kovacevic | G06F 21/6218 |
| | | | | 707/781 |
| 2015/0089382 | A1* | 3/2015 | Feng | H04L 47/12 |
| | | | | 715/740 |
| 2015/0142507 | A1* | 5/2015 | Osman | G06Q 10/06 |
| | | | | 705/7.28 |
| 2015/0278392 | A1* | 10/2015 | Vivalda | G06F 17/30914 |
| | | | | 707/600 |
| 2016/0103903 | A1* | 4/2016 | Vivalda | H04L 65/403 |
| | | | | 709/204 |
| 2016/0103914 | A1* | 4/2016 | Im | H04L 63/20 |
| | | | | 707/770 |
| 2016/0140198 | A1* | 5/2016 | Laschinger | G06F 17/30592 |
| | | | | 711/162 |

(Continued)

*Primary Examiner* — Matthew J Ellis
(74) *Attorney, Agent, or Firm* — Buckley, Maschoff & Talwalkar LLC

(57) ABSTRACT

A system may include presentation of one or more measure values, each of the one or more measure values corresponding to a member of each of one or more dimension, reception of a first instruction to copy one of the one or more measure values, storage, in response to the first instruction, of the one measure value and a corresponding member of each of one or more dimensions, reception of a second instruction to paste the stored one measure value to a local application, and, in response to the second instruction, writing of the stored one measure value and corresponding member of each of one or more dimensions to the local application.

15 Claims, 14 Drawing Sheets

| | | Billed Quantity | | |
|---|---|---|---|---|
| | Product Group | Hardware software | Accessories+space | Overall Result |
| Calendar Year/Month | Product | 1,000 PC | 1,000 PC | 1,000 PC |
| Jan 2003 | Automatic Umbrella | | 1,998 | 1,998 |
| | Camera Connector | 920 | 5,701 | 5,701 |
| | Flatscreen Vision I | 2,332 | | |
| | Harddrive onTour | 4,637 | | |
| | Phone PX2 updated | | | |
| | Stereo Kit | | | |
| | USB MegaStorage | | 14,717 | |
| | Result | | 21,686 | |
| Feb 2003 | Automatic Umbrella | | | |
| | Camera Connector | | 5,549 | 5,549 |
| | Flatscreen Vision I | 2,277 | | 2,277 |
| | Harddrive onTour | 4,540 | | 4,540 |
| | Phone PX2 updated | | 16,193 | 16,193 |
| | Stereo Kit | | 10,515 | 10,515 |
| | USB MegaStorage | 14,277 | | 14,277 |
| | Result | 21,094 | 34,231 | 55,325 |

Context menu (915): Copy Ctrl+C; Context Copy to Spreadsheet; Context Copy to eMail; Context Copy to Analysis Client; Print...; Inspect element (910)

(56) References Cited

U.S. PATENT DOCUMENTS

2017/0033972 A1\* 2/2017 Vivalda ............... H04L 41/0233
2017/0140320 A1\* 5/2017 English ............ G06Q 10/06375

\* cited by examiner

| Calendar Year/Month | Product Group | Billed Quantity | | |
|---|---|---|---|---|
| | | Hardware software | Accessories+space | Overall Result |
| | Product | 1,000 PC | 1,000 PC | 1,000 PC |
| Jan 2003 | Automatic Umbrella | | 1,998 | 1,998 |
| | Camera Connector | 410 | 5,701 | 5,701 |
| | Flatscreen Vision I | 2,332 | | 2,332 |
| | Harddrive onTour | 4,637 | Copy — Ctrl+C | 637 |
| | Phone PX2 updated | | Context Copy — 425 | 731 |
| | Stereo Kit | | Print... | 717 |
| | USB MegaStorage | 14,717 | Inspect element | 420 — 709 |
| | Result | 21,686 | 35,041 | 56,727 |
| Feb 2003 | Automatic Umbrella | | 1,974 | 1,974 |
| | Camera Connector | | 5,549 | 5,549 |
| | Flatscreen Vision I | 2,277 | | 2,277 |
| | Harddrive onTour | 4,540 | | 4,540 |
| | ihone PX2 updated | | 16,193 | 16,193 |
| | Stereo Kit | | 10,515 | 10,515 |
| | USB MegaStorage | 14,277 | | 14,277 |
| | Result | 21,094 | 34,231 | 55,325 |

| Calendar Year/Month | Product Group | Billed Quantity | | Overall Result |
|---|---|---|---|---|
| | | Hardware software | Accessories+space | |
| | Product | 1,000 PC | 1,000 PC | 1,000 PC |
| Jan 2003 | Automatic Umbrella | | 1,998 | 1,998 |
| | Camera Connector | 920 | 5,701 | 5,701 |
| | Flatscreen Vision I | 2,332 | Copy        Ctrl+C | |
| | Harddrive onTour | 4,637 | Context Copy to Spreadsheet ─915 | |
| | Phone PX2 updated | | Context Copy to eMail | |
| | Stereo Kit | | Context Copy to Analysis Client | |
| | USB MegaStorage | 14,717 | Print... | |
| | Result | 21,686 | | |
| Feb 2003 | Automatic Umbrella | | Inspect element | 5,549 |
| | Camera Connector | | 5,549   ─910 | 2,277 |
| | Flatscreen Vision I | 2,277 | | 4,540 |
| | Harddrive onTour | 4,540 | | 16,193 |
| | Phone PX2 updated | | 16,193 | 10,515 |
| | Stereo Kit | | 10,515 | 14,277 |
| | USB MegaStorage | 14,277 | | 55,325 |
| | Result | 21,094 | 34,231 | |

*FIG. 9*

|  |  | Net Value stat curr |  |
|---|---|---|---|
|  | Calendar Year/Month | Overall Result | 2013 |
| Region | Product Category | EUR | EUR |
| Worldwide | Mobile Devices | 134,295,729.00 | 134,295,729.00 |
|  | Monitors | 143,477,924.00 | 143,477,924.00 |
|  | Notebooks | 134,657,468.00 | 134,657,468.00 |
|  | Result | 412,431,121.00 | 412,431,121.00 |
| EMEA | Mobile Devices | 73,460,131.00 | 73,460,131.00 |
|  | Monitors | 80,638,396.00 | 80,638,396.00 |
|  | Notebooks | 69,216,754.00 | 69,216,754.00 |
|  | Result | 223,315,281.00 | 223,315,281.00 |
| Europe | Mobile Devices | 73,460,131.00 | 73,460,131.00 |
|  | Monitors | 80,638,396.00 | 80,638,396.00 |
|  | Notebooks | 69,216,754.00 | 69,216,754.00 |
|  | Result | 223,315,281.00 | 223,315,281.00 |
| France | Mobile Devices | 31,173,338.00 | 31,173,338.00 |
|  | Monitors | 32,138,778.00 | 32,138,778.00 |
|  | Notebooks | 27,840,590.00 | 27,840,590.00 |
|  | Result | 91,152,706.00 | 91,152,706.00 |
| Paris | Mobile Devices | 31,173,338.00 | 31,173,338.00 |
|  | Monitors | 32,138,778.00 | 32,138,778.00 |
|  | Notebooks | | 27,840,590.00 |
|  | Result | | 91,152,706.00 |

Context menu (1220):
- Copy     Ctrl+C
- Context Copy (1225)
- Print...
- Inspect element

CONTEXT-AWARE COPYING OF MULTIDIMENSIONAL DATA CELLS

BACKGROUND

Enterprise software systems receive, generate and store data related to many aspects of a business enterprise. These systems may provide reporting, planning, and/or analysis of the data based on logical entities known as dimensions and measures. Dimensions represent sets of values (i.e., members) along which an analysis may be performed or a report may be generated (e.g., Country, Year, Product), and measures are indicators, most often numeric, whose values can be determined for a given combination of dimension members. For example, a value of the Sales measure may be determined for bicycles (i.e., a member of the Product dimension) in January (i.e., a member of the Month dimension).

The interrelationships between dimension members and measure values are complex and multi-faceted. These interrelationships inhibit manipulation and/or synthesis of disparate measure values. Moreover, due to the foregoing, current systems fail to provide efficient usage of dimension-dependent measures across heterogeneous software applications.

BRIEF DESCRIPTION OF THE DRAWINGS

FIG. 4 is a view of a user interface of a first application according to some embodiments.

FIG. 9 is a view of a user interface of a first application according to some embodiments.

FIG. 12 is a view of a user interface according to some embodiments.

DETAILED DESCRIPTION

Figure 1:
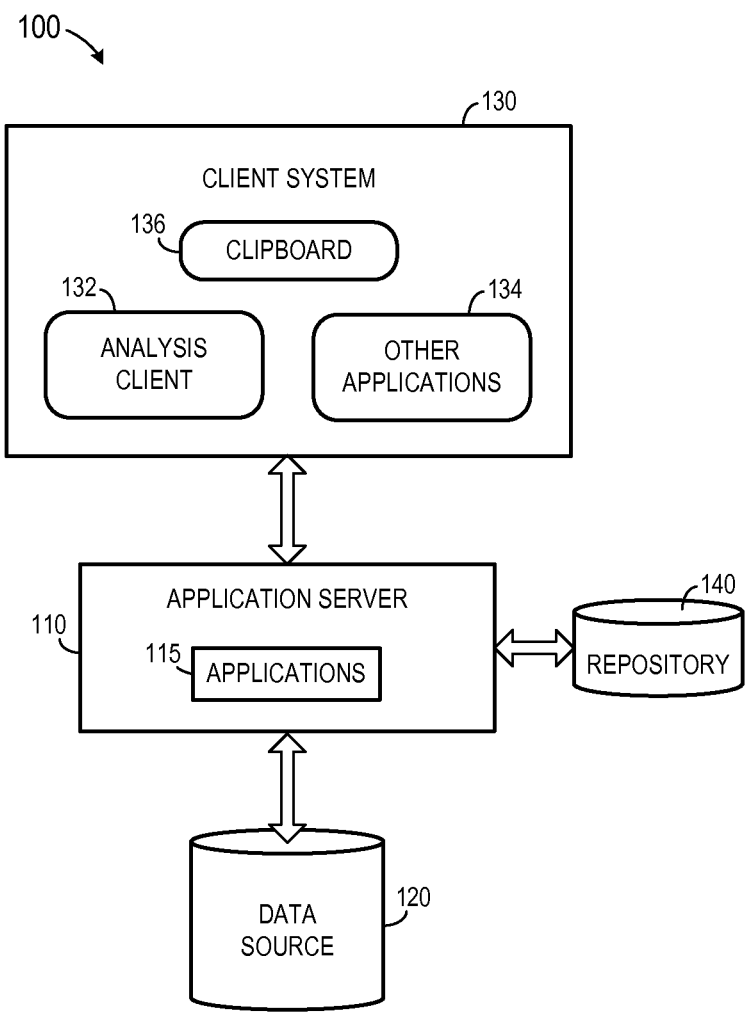
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners.

System 100 includes application server 110 to provide data of data source 120 to client system 130. For example, application server 110 may execute one of applications 115 to receive a request for a report from analysis client 132 executed by client system 130, to query data source 120 for data required by the report, receive the data from data source 120, perform any necessarily calculations on the data, format the report including its data, and return the report to client system 130.

Application server 110 may provide similar functionality to other (unshown) client systems. Data source 120 and application server 110 may support multi-tenancy to separately support multiple unrelated clients by providing multiple logical database systems which are programmatically isolated from one another.

Data source 120 may comprise any one or more systems to store business data. The data stored in data source 120 may be received from disparate hardware and software systems, some of which are not interoperational with one another. The systems may comprise a back-end data environment employed in a business or industrial context. The data may be pushed to data source 120 and/or provided in response to queries received therefrom.

The data may comprise a relational database, a multi-dimensional database, an eXtendable Markup Language (XML) document, and/or any other structured data storage system. The physical tables of data source 120 may be distributed among several relational databases, multi-dimensional databases, and/or other data sources. For example, data source 120 may comprise one or more OnLine Analytical Processing (OLAP) databases (i.e., cubes). To provide economies of scale, data source 120 may include data of more than one customer. In this scenario, application server 110 includes mechanisms to ensure that a client accesses only the data that the client is authorized to access. Moreover, the data of data source 120 may be indexed and/or selectively replicated in an index.

Data source 120 may implement an "in-memory" database, in which volatile (e.g., non-disk-based) storage (e.g., Random Access Memory) is used both for cache memory and for storing data during operation, and persistent storage (e.g., one or more fixed disks) is used for offline persistency of data and for maintenance of database snapshots. Alternatively, volatile storage may be used as cache memory for storing recently-used database data, while persistent storage stores data. In some embodiments, the data comprises one or more of conventional tabular data, row-based data stored in row format, column-based data stored in columnar format, and object-based data.

Client system 130 may comprise one or more devices executing program code of a software application for presenting user interfaces to allow interaction with applications 115 of application server 110. Client system 130 may comprise a desktop computer, a laptop computer, a personal digital assistant, a tablet PC, and a smartphone, but is not limited thereto.

Analysis client 132 may comprise program code of a spreadsheet application, a spreadsheet application with a plug-in allowing communication (e.g. via Web Services) with application server 110, a rich client application (e.g., a Business Intelligence tool), an applet in a Web browser, or any other application to perform the processes attributed thereto herein.

Other applications 134 may comprise one or more of a word processing application, an electronic mail application, a graphics application, a publishing application, and any other application suitable for receiving measure values and dimension members according to some embodiments. Clipboard 136 may comprise any memory devices and/or locations suitable for storing copied measure values and dimension members, and for retrieving measure values and dimension members therefrom for writing to one or more of other applications 134.

Repository 140 stores metadata and data for use by application server 110. The metadata may specify a schema of data source 120, which may be used by application server 110 to query data source 120. The metadata may also define users, workspaces, data source connections, and dimension member hierarchies.

Although system 100 has been described as a distributed system, system 100 may be implemented in some embodiments by a single computing device. For example, both client system 130 and application server 110 may be embodied by an application executed by a processor of a desktop computer, and data source 120 may be embodied by a fixed disk drive within the desktop computer.

Figure 2:
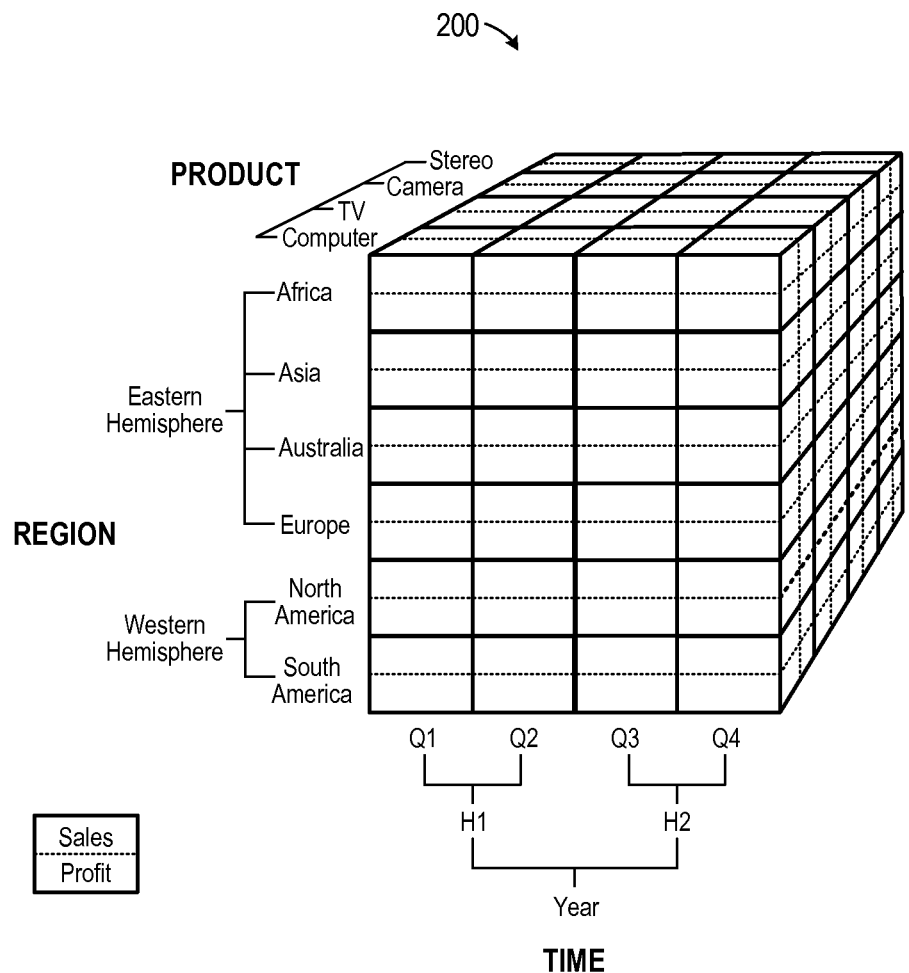
FIG. 2 is a diagram of a multi-dimensional cube including dimension hierarchies and measure values.

FIG. 2 illustrates OLAP cube 200 according to some embodiments. As described above, embodiments are not limited to OLAP technology or to three-dimensional datasets. Cube 200 stores measure values corresponding to combinations of orthogonal dimension values. Specifically, for each combination of dimension values (e.g., Q1, Asia, Camera), cube 200 stores a value of the measure Sales and a value of the measure Profit. In other words, each measure value stored in cube 200 is associated with a set of dimension values.

A dimension hierarchy may include dimensions arranged in a hierarchical format, in which each member of each of the dimensions is hierarchically related to members which lie above and below it in the hierarchy. For example, cube 200 represents time by the dimension hierarchy Year>Half>Quarter, and region by the dimension hierarchy Hemisphere>Continent. In another example, geography may be represented by the dimension hierarchy: Continent>Country>State>City. In the former example, each member of the Half dimension is hierarchically-related to a member of the Year dimension and to one or more members of the Quarter dimension.

Figure 3:
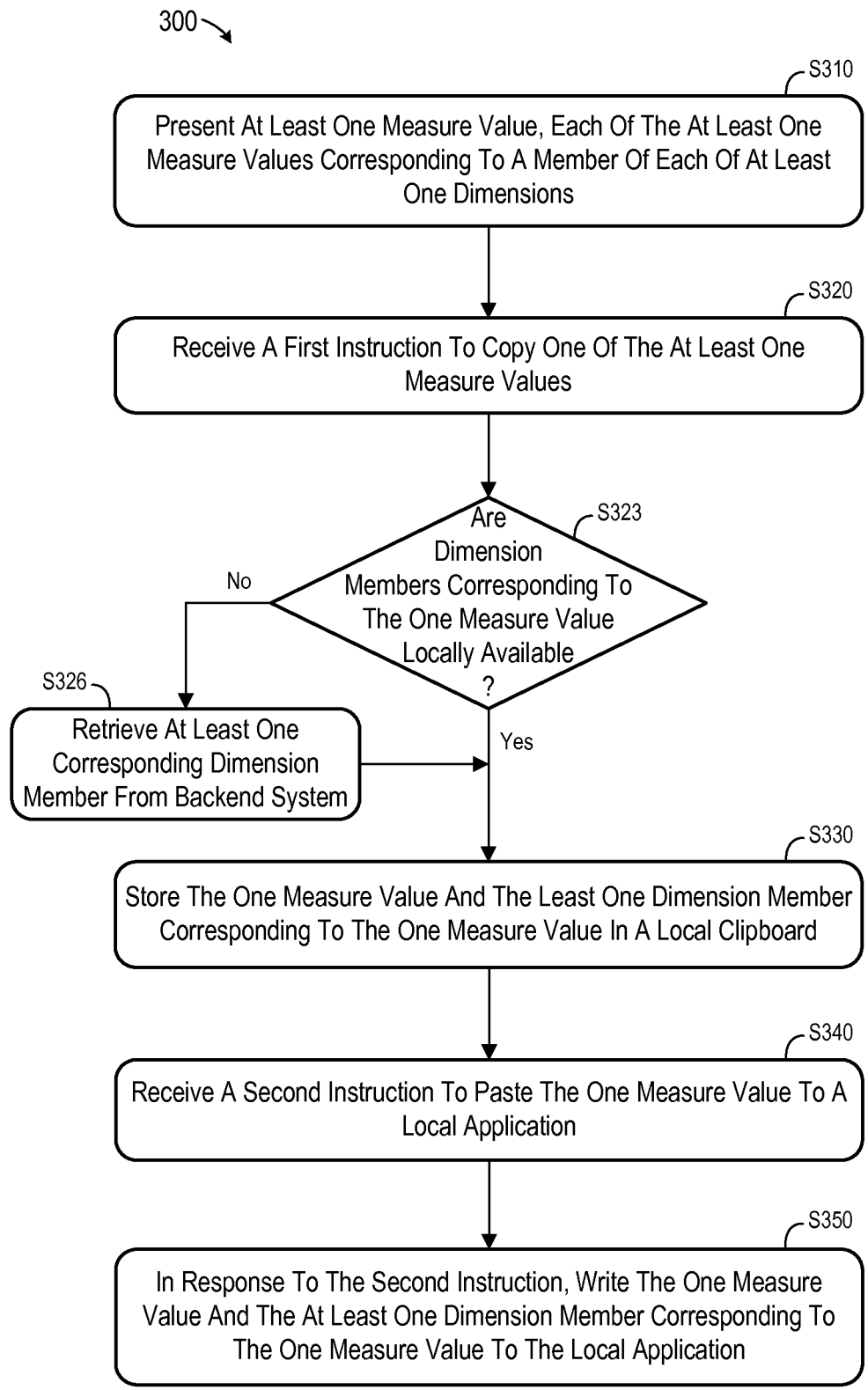
FIG. 3 is a flow diagram of a process according to some embodiments.

FIG. 3 comprises flow diagram of process 300 according to some embodiments. In some embodiments, various hardware elements of system 100 execute program code to perform process 300. In some embodiments, hard-wired circuitry may be used in place of, or in combination with, program code for implementation of processes according to some embodiments. Embodiments are therefore not limited to any specific combination of hardware and software.

Prior to S310, a user may operate analysis client 132 to request a plurality of measure values from application server 110. For example, a user may manipulate a user interface of analysis client 132 to specify at least one measure and at least one member of each of at least one dimensions. Any querying/reporting/analysis paradigm that is or becomes known may be used to specify the measure(s) and dimension member(s) according to some embodiments. In some examples, the user drags and drops dimension members and measures from a list into a workspace of a user interface.

The specified dimension members and measures may be received by an application 115 of application server 110 as a request to receive values of the measures which correspond to the dimension members. Application server 110 may therefore query data source 120 for these values (e.g., using metadata of repository 140) and return the values to analysis client 132.

Client system 130 presents the measure values at S310. Each of the measure values corresponds to a member of each of the at least one dimensions. To assist in the present description of an example of process 300, FIG. 4 shows a view of table 400 according to some embodiments. Table 400 may be presented on a display of client system 130 in response to execution of analysis client 132 processor of client system 130. Alternatively, table 400 may be a Web page displayed by a Web browser executed by the processor. Embodiments are not limited to these examples.

Table 400 of FIG. 4 presents values of a Billed Quantity measure which are stored by a data source (e.g., data source 110). The data source may comprise an OLAP cube defining dimensions, dimension members and measures. As shown, each value of the Billed Quantity measure presented in table 400 corresponds to one member of each of three dimensions: Calendar Year/Month, Product and Product Group. For example, the measure value 1,998 corresponds to the "January 2003" member of the Calendar Year/Month dimension, the "Automatic Umbrella" member of the Product dimension, and the "Accessories+space" member of the Product Group dimension.

Embodiments are not limited to the structure of table 400, or to presentation of the measure values in a tabular form. Moreover, according to some embodiments, any number of the dimensions member corresponding to a measure value might not be displayed.

Continuing with process 300, a first instruction may be received at S320 to copy one of the presented measure values. In some embodiments of S320, the user may "right-click" on one of the presented measure values, or perform any other suitable input gesture, to cause display of a context menu which includes a "copy" option. According to some embodiments, the user issues the first instruction by selecting the measure value and performing a suitable keystroke combination. Embodiments are not limited to the manner in which the copy instruction is input or received.

As shown in the FIG. 4 example, the user has "right-clicked" on measure value 410, causing display of context menu 420. The user has also selected "Context Copy" option 425 of context menu 420. As a result, the first instruction to copy the measure value is received by analysis client 132 at S320.

According to some embodiments, in a case that table 400 is presented by a Web browser executed by client system 130, a Web application 115 of application server 110 may provide JavaScript to the Web browser to enrich the context menu of the Web browser. In other embodiments, an analysis client 132 of client system 130 includes code to enrich its associated context menu.

In response to the first instruction, it is determined at S323 whether dimension members corresponding to the measure value to be copied are locally available (e.g., stored on client system 130). According to some embodiments, the "corresponding" dimension members include those members which are visible during selection of the measure value. In the case of FIG. 4, these "visible" dimension members are "Flatscreen Vision I", "Hardware software" and "January 2003".

Figure 5:
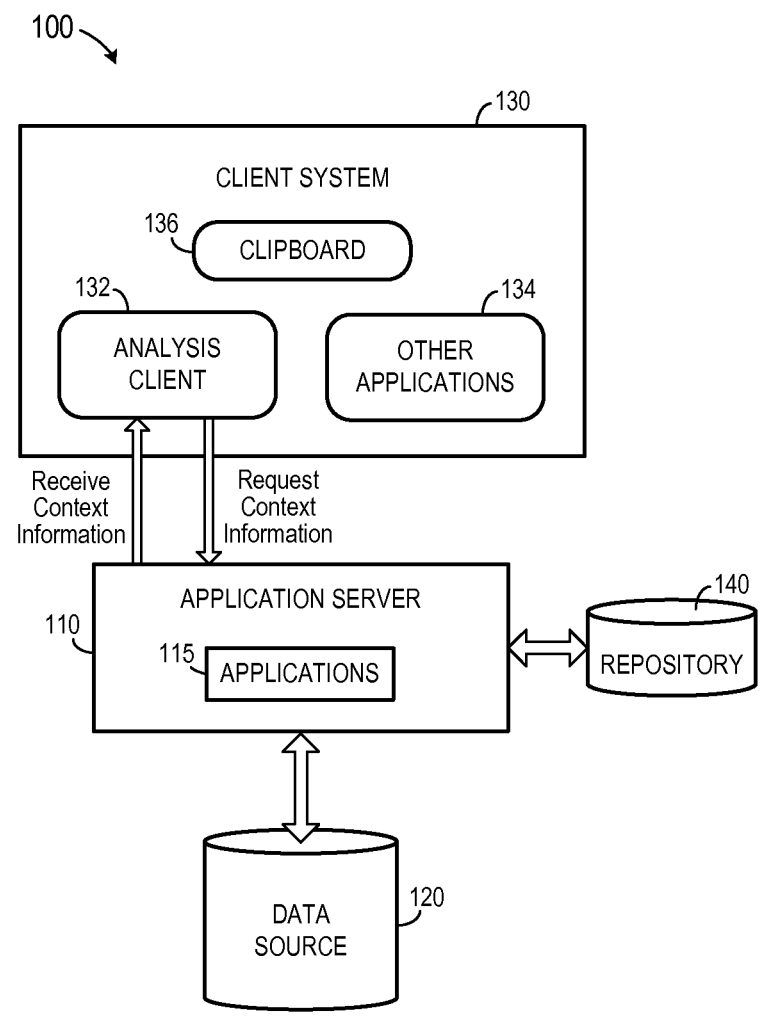
FIG. 5 is a block diagram of a system according to some embodiments.

If the dimension members are not locally available, the dimension members are retrieved from a backend system at S326. Retrieval may comprise sending a request to application server 110 for context information associated with the measure value, and receiving the context information therefrom, as illustrated in FIG. 5. Context information may include the visible and/or non-visible dimension members associated with the measure value, as well as any other suitable information, including but not limited to a technical key.

Figure 6:
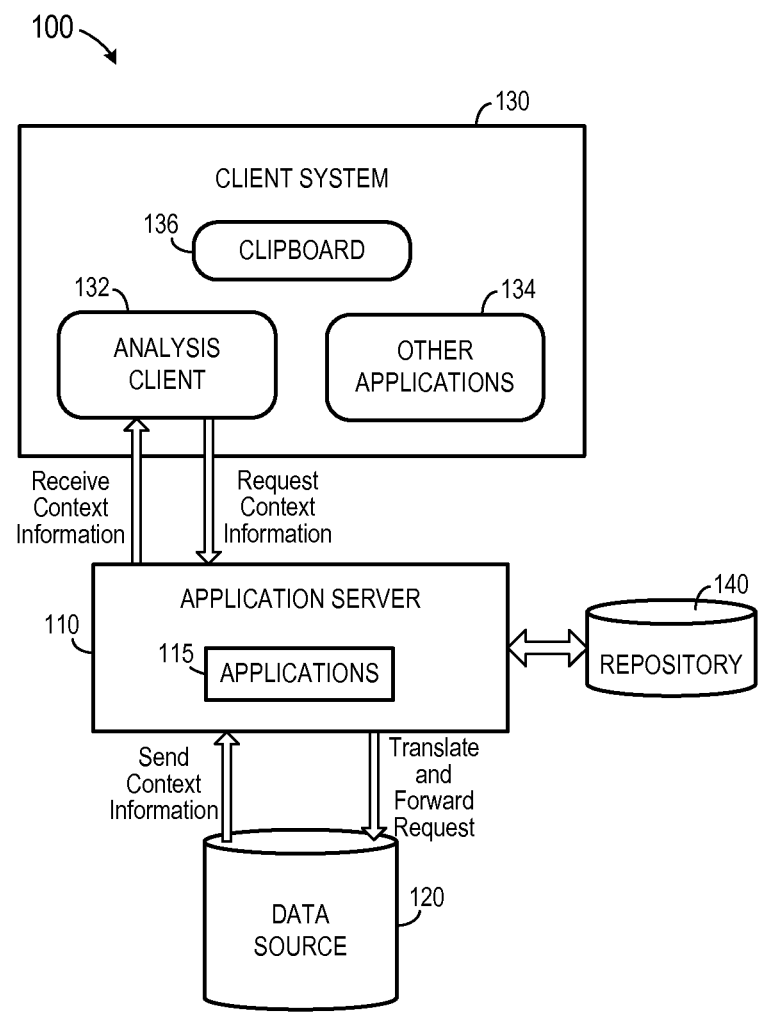
FIG. 6 is a block diagram of a system according to some embodiments.

FIG. 6 illustrates a scenario in which the context information is stored in data source 120. In such an instance, application server 110 translates the request for context information and forwards the request to data source 120. Data source 120 then sends the information to application server 110 for forwarding onto client system 130.

The dimension members may be retrieved using a function provided by analysis client 132 of client system 130 or, in a case that process 200 is executed by a Web browser of client system 130, using a function implemented in JavaScript provided by a Web application 115 of application server 110.

Flow proceeds to S330 from S326 or, if the dimension members are locally-available, from S323. The measure value and each of the dimension members corresponding to the stored measure value are stored in a local clipboard at S330. Again referring to the FIG. 4 example, the measure value "2,332" is stored in the local clipboard, along with the corresponding dimension members "Flatscreen Vision I", "Hardware software" and "January 2003". As mentioned above, the measure value may also be associated with one or more other dimension members and, according to some embodiments, these non-visible dimension members are also stored at S330. According to some embodiments, the dimensions corresponding to each dimension member (e.g., Product, Product Group and Calendar Year/Month are also stored at S330.

The measure value and dimension members may be stored in the clipboard in any suitable manner. In some embodiments, the measure value and dimension members of the above example are stored in the following text format: Billed Quantity for Calendar Year/Month "January 2003", Product group "Hardware software", Product "Flatscreen Vision I": 2,332,000 PC. This example also accounts for the scaling factor "1,000 PC".

The local clipboard may comprise any storage area of client system 130 which may be shared among applications executing on client system 130. For example, local clipboard 136 may comprise an area of Random Access Memory to which a first application may write data (e.g., via a "Copy" command) and from which the data may be written to a second application (e.g., via a "Paste" command).

In this regard, an instruction to paste the measure value to a local application is received at S340. The instruction may be received by one of other applications 134 executing on client system 130. The instruction may be received by the one application 134 via a context menu, a toolbar, or other interface as is known. Any duration of time may elapse between S330 and S340, as long as the measure value and dimension members remain in the local clipboard (e.g., client system 130 is not shut down or rebooted, or the clipboard is overwritten).

Figure 7:
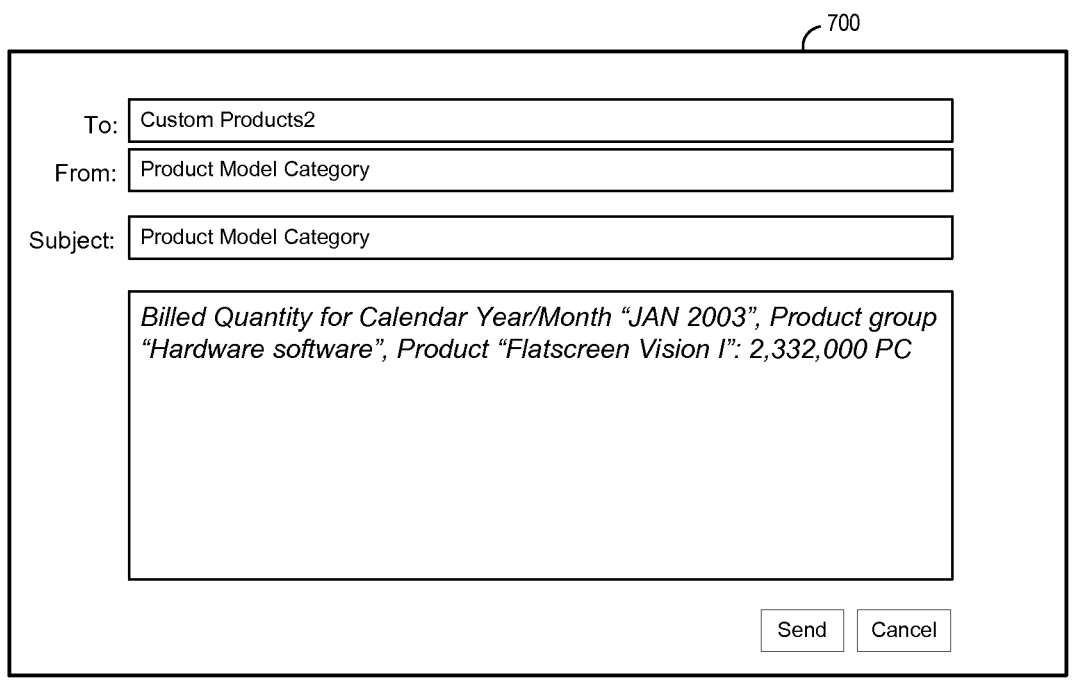
FIG. 7 is a view of a user interface of a second application according to some embodiments.

In response to the second instruction, the measure value and the dimension members are written to the local application at S350. FIG. 7 illustrates writing of the stored information of the present example to window 700 of an electronic mail application. The local application may comprise any application to which such information may be written.

According to some embodiments, the local application includes functionality to parse the information written from the clipboard and present it in an application-specific format. In some embodiments, which will be described below, the measure value and dimension members are stored at S330 in a format which takes into account the application to which the information will be written.

Figure 8:
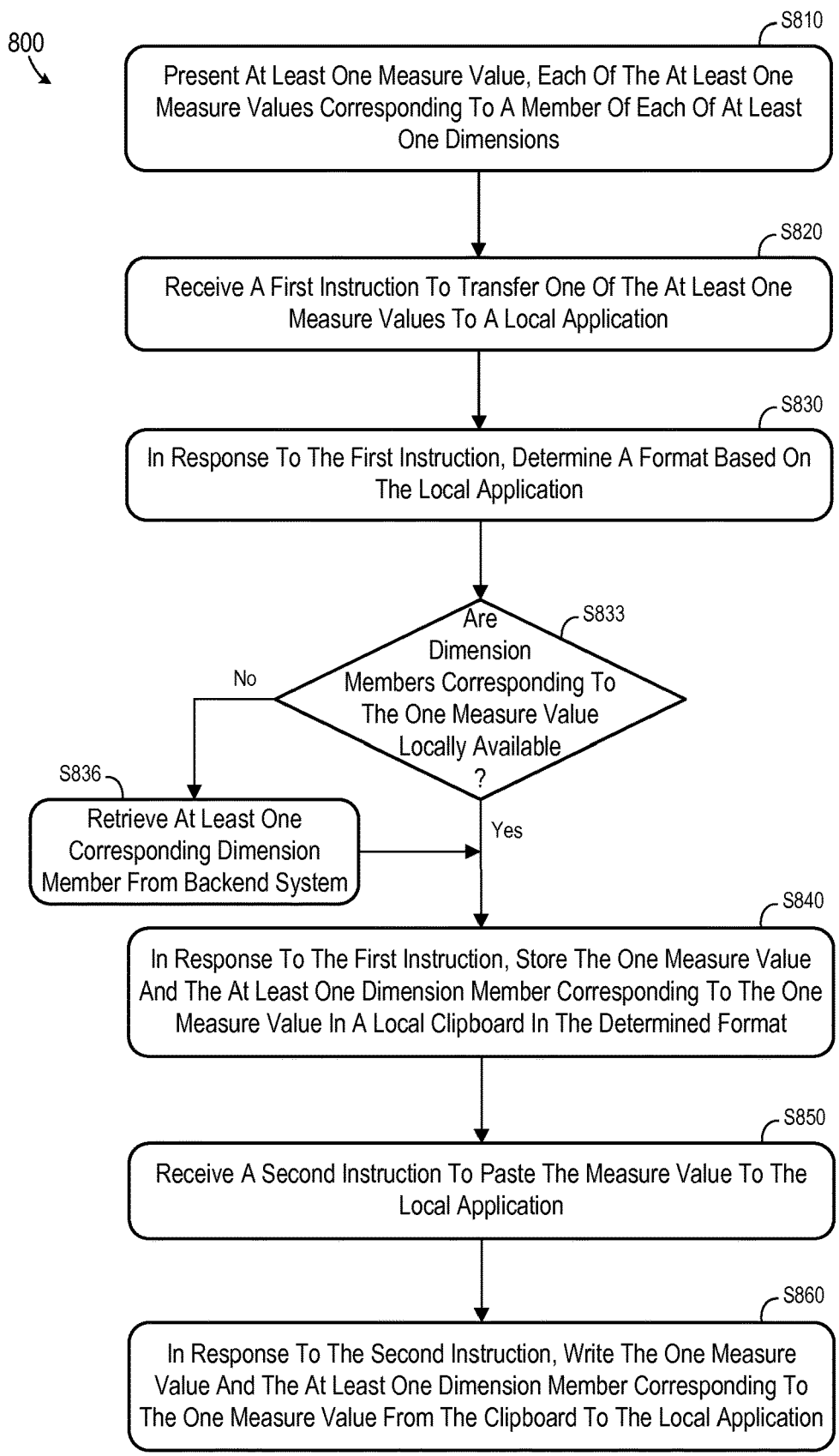
FIG. 8 is a flow diagram of a process according to some embodiments.

Process 800 of FIG. 8 illustrates one such embodiment. S610 may proceed as described above with respect to S810 to present at least one measure value which corresponds to a member of each of at least one dimensions. At S820, a first instruction is received to transfer one of the at least one measure values to a local application.

FIG. 9 is a view of table 900 and context menu 910 illustrating S810 and S820 according to some embodiments. Table 900 is identical to table 400 of FIG. 4, and context menu 910 may be displayed upon "right-clicking" measure value 920. Context menu 910 includes three "Context Copy" menu items, each of which corresponds to a different target local application. The user in the present example has selected item 915, "Context Copy to Spreadsheet". This selection results in reception of the first instruction at S820.

In response to the instruction, a format is determined based on the local application to which the information is to be transferred. In the present example, the format may comprise a tabular structure which can be interpreted by and incorporated into a spreadsheet application. Such a structure may conform to a standard spreadsheet format, such as .csv, .xls or the like.

S840 through S860 proceed as described above with respect to S330 through S350. However, the measure value and the dimension members are stored in the local clipboard at S840 in the determined format. Accordingly, once the measure value and the dimension members are written to the local application at S860, the local application may efficiently display the measure value and the dimension members.

Figure 10:
FIG. 10 is a view of a user interface of a second application according to some embodiments.

FIG. 10 illustrates writing of the stored information of the present example to window 1000 of a local spreadsheet application at S860. As shown, the measure value "2,332" is presented within the context of dimension members "Flatscreen Vision I", "Hardware software" and "January 2003", as well as dimensions Product, Product Group and Calendar Year/Month.

Figure 11:
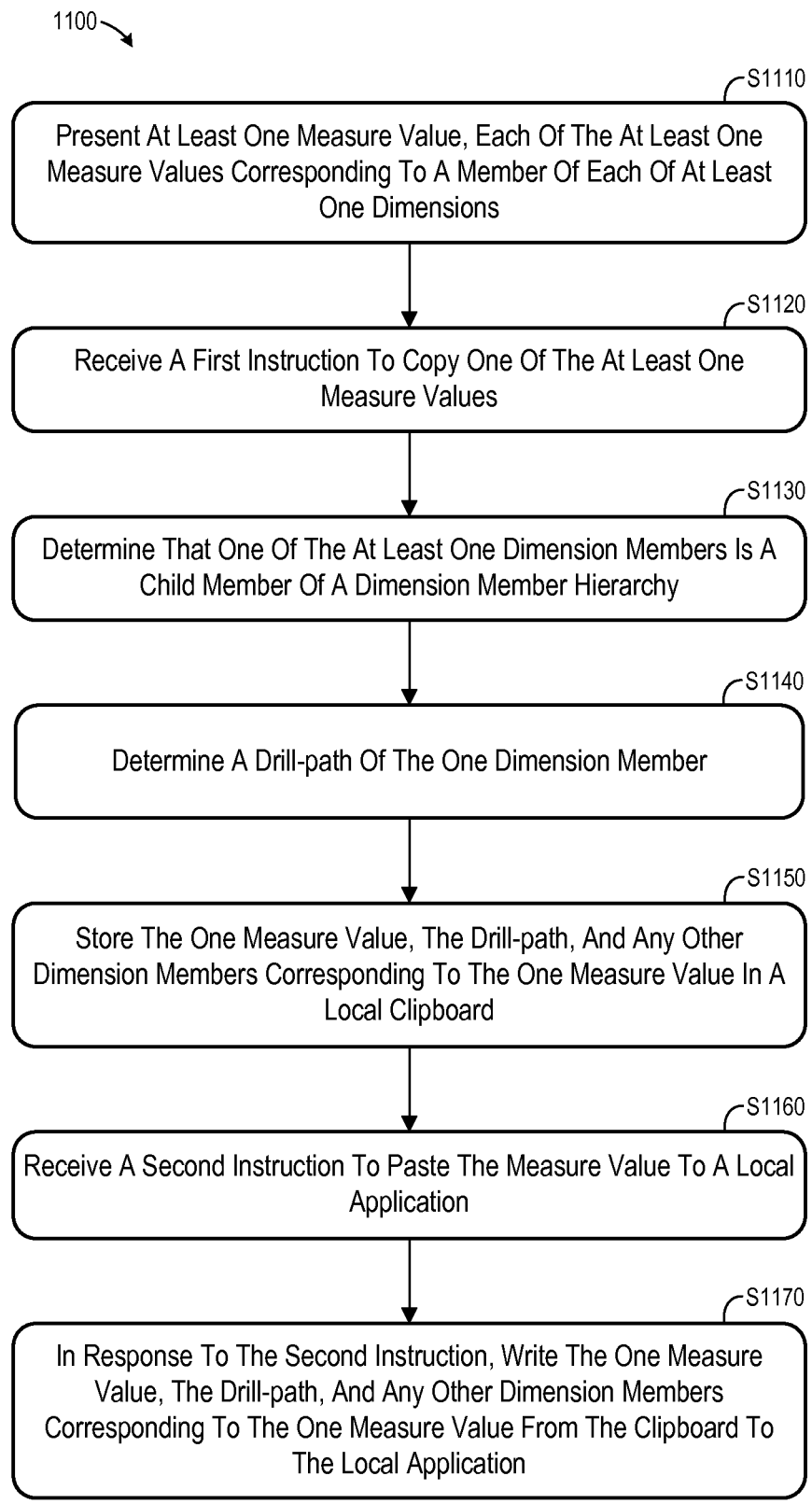
FIG. 11 is a flow diagram of a process according to some embodiments.

FIG. 11 illustrates process 1100 according to some embodiments. S1110 and S1120 proceed, in some embodiments, as described above with respect to S310 and S320. In this regard, FIG. 12 illustrates table 1200 of measure values and associated dimension members. The user has "right-clicked" on measure value 1210, resulting in display of context menu 1220. The user has also selected "Context Copy" item 1225.

Next, at S1130, it is determined that one of the dimension members is a child member of a dimension hierarchy. In the case of the FIG. 12 example, the dimension hierarchy is included in the Region dimension. Specifically, the dimension member "Paris" corresponding to the selected measure value 1210 is a child member of a Region dimension hierarchy. The Region dimension hierarchy includes dimension members "Europe" and "France", among others, and defines hierarchical relationships between these members.

A drill-path of the member of the dimension hierarchy is determined at S1140. The drill-path consists of a chain of dimension members from a member of the root dimension of the dimension hierarchy to the member corresponding to the selected measure value. The determined drill-path according to the FIG. 12 example may be: "Worldwide>EMEA>Europe>France>Paris".

In some embodiments, more than one of the corresponding dimension members may be a child member of a dimension hierarchy. Accordingly, one drill path for each of such dimension members is determined in S1140. If none of the corresponding dimension members is a child member of a dimension hierarchy, flow may proceed as described with respect to S330 through S350 of process 300.

After determination of the drill-path, flow proceeds to S1150 to store the measure value, the drill-path of the child member of the dimension hierarchy, and each of the other corresponding dimension members in the local clipboard. According to the FIG. 11 example, the measure value "32,138,778.00" is stored in the local clipboard, along with the drill-path "Worldwide>EMEA>Europe>France>Paris" and dimension members "2013" and "Monitors". In some embodiments, the corresponding dimensions Region, Calendar Year/Month and Product Category are also stored in the local clipboard at S1150.

In some embodiments, the measure value, drill-path and dimension members of the present example are stored in the following text format: Net Value stat curr for Region "Worldwide>EMEA>Europe>France>Paris", Calendar Year/Month "2013", Product Category "Monitors": 32.138.778,00 EU. This information may be stored in the local clipboard at S1150 in any format. Some embodiments of process 1100 may incorporate elements of process 200 (e.g., S830, S840) to determine the format based on an application to which the information will be subsequently written.

According to some embodiments, a function is called to execute the determinations at S1130 and S1140, and to retrieve the dimension members and format the dimension members and measure value for storage at S1150. The function may retrieve the hierarchy, the drill-path, and the dimension members from application server 110, from data source 120, or from client system if this information is local. The function may be provided by analysis client 132 of client system 130 or, in a case that process 1100 is executed by a Web browser of client system 130, the function may be implemented in JavaScript provided by a Web application 115 of application server 110.

An instruction to paste the measure value to a local application is received at S1160. The instruction may be received by one of other applications 134 executing on client system 130. The instruction may be received by the one application 134 via a context menu, a toolbar, or other interface as is known. Any duration of time may elapse between S1150 and S1160, as long as the measure value, drill-path and dimension members remain in the local clipboard (e.g., client system 130 is not shut down or rebooted, or the clipboard is overwritten).

The measure value, the drill-path and the dimension members are written from the local clipboard to the local application at S1170 in response to the second instruction. The local application may comprise any application to which such information may be written. As described with respect to FIGS. 7 and 10, the information may be displayed and/or parsed by the local application.

Figure 13:
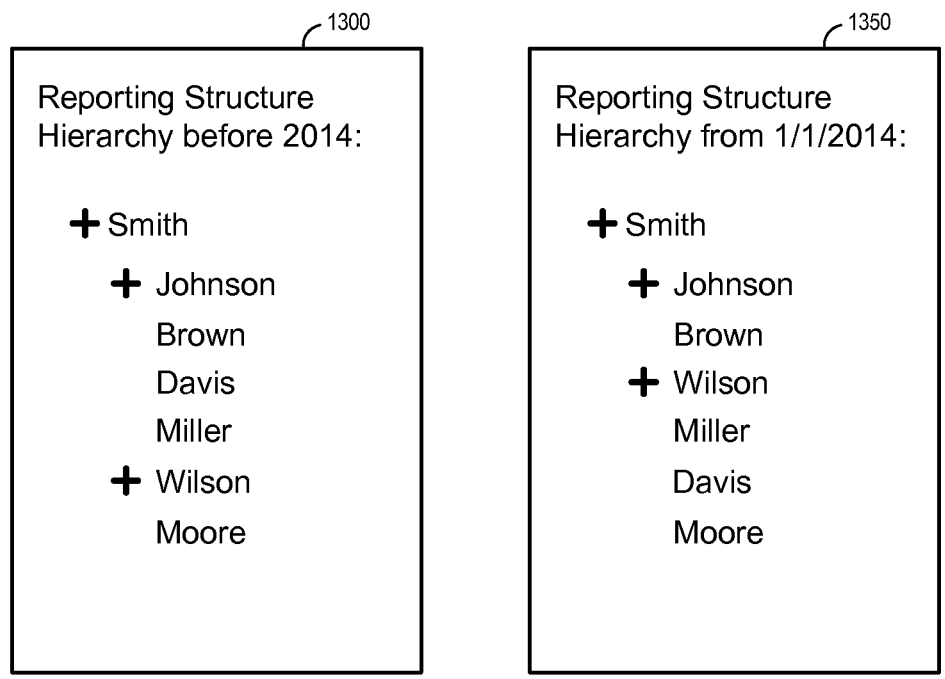
FIG. 13 illustrates a time-based dimension hierarchy according to some embodiments.

In the case of the above-described dimension hierarchies, the drill-path provides context for the hierarchical dimension. FIG. 13 illustrates time-based hierarchies 1300 and 1350 according to some embodiments. Hierarchy 1300 reflects a reporting structure as it existed prior to 2014, and hierarchy 1350 reflects a reporting structure after Jan. 1, 2014. For a time-based hierarchy, the context stored in S1150 may also include a key date/time associated with the hierarchy.

Figure 14:
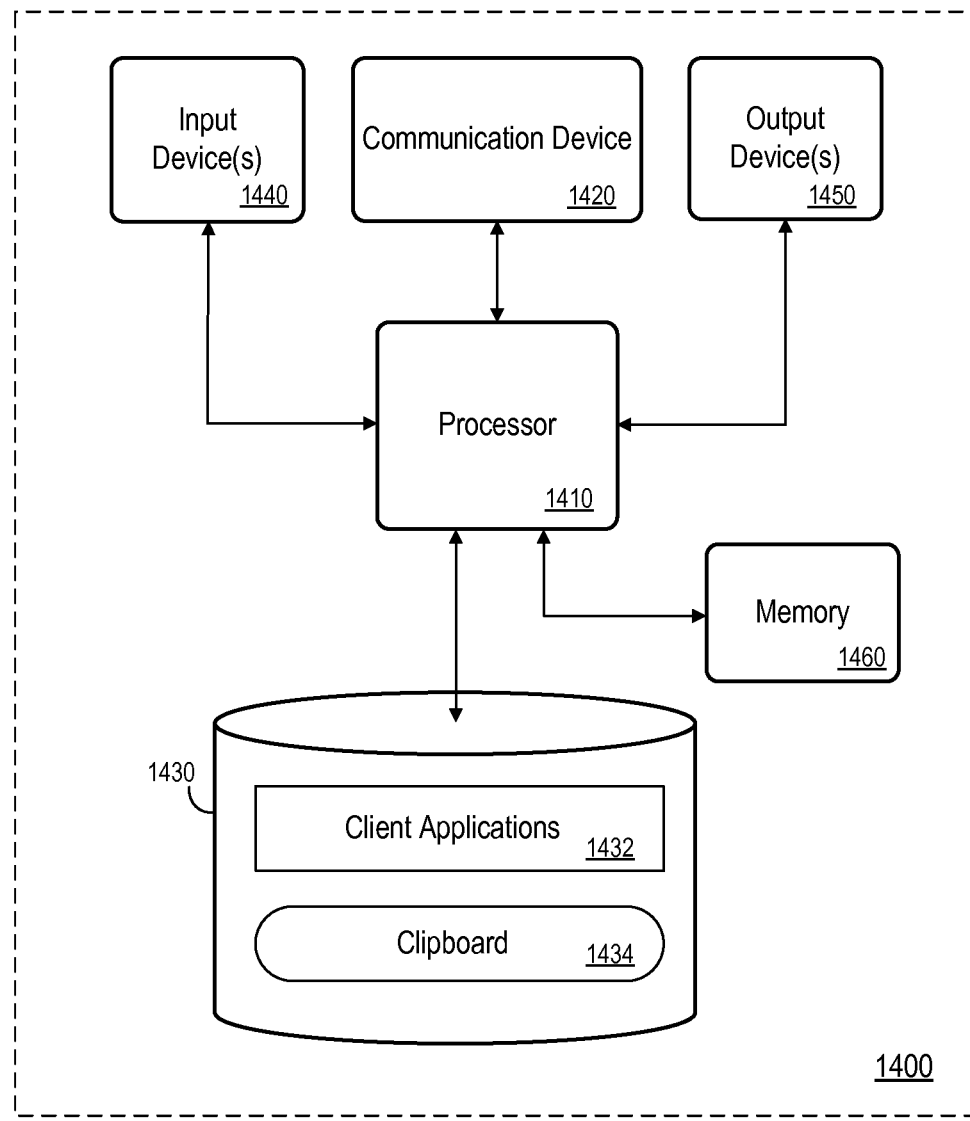
FIG. 14 is a block diagram of a computing device according to some embodiments.

FIG. 14 is a block diagram of apparatus 1400 according to some embodiments. Apparatus 1400 may comprise a general-purpose computing apparatus and may execute program code to perform any of the functions described herein. Apparatus 1400 may comprise an implementation of one or more elements of system 100, such as client system 130. Apparatus 1400 may include other unshown elements according to some embodiments.

Apparatus 1400 includes processor 1410 operatively coupled to communication device 1420, data storage device 1430, one or more input devices 1440, one or more output devices 1450 and memory 1460. Communication device 1420 may facilitate communication with external devices, such as application server 110. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to manipulate graphical user interfaces and to input information into apparatus 1400. Output device(s) 1450 may comprise, for example, a display (e.g., a display screen) a speaker, and/or a printer.

Data storage device 1430 may comprise any device, including combinations of magnetic storage devices (e.g., magnetic tape, hard disk drives and flash memory), optical storage devices, Read Only Memory (ROM) devices, etc., while memory 1460 may comprise Random Access Memory (RAM).

Client applications 1432 of data storage device 1430 may comprise program code executable by processor 1410 to provide any of the functions described herein, including but not limited to processes 300, 800 and 1100. Embodiments are not limited to execution of these functions by a single one of client applications 1432. Clipboard 1434 may store information in response to an instruction to copy one or more measure values, as described herein. The clipboard may also alternatively be stored in memory 1460. Data storage device 1430 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, the method comprising:

presenting one or more measure values, each of the one or more measure values corresponding to a member of each of multiple dimensions;

receiving, by a first application, a first user input to transfer one of the one or more measure values including context information associated with the one measure value to a second application, wherein the second application is designated by the first user input and the context information includes members of multiple dimensions associated with the one measure value;

in response to the first user input, determining a format based on the second application and storing the one measure value and a corresponding member of each of multiple dimensions in a local clipboard memory in the determined format, wherein the first application and the second application are heterogeneous applications with different formats and wherein the local clipboard memory is shared among the first application and the second application;

receiving, by the first application, a second user input to paste the stored one measure value including the context information associated with the one measure value to the second application; and in response to the second user input, writing the stored one measure value and corresponding member of each of multiple dimensions from the local clipboard memory to the second application.

2. A method according to claim 1, wherein storing the one measure value and a corresponding member of each of multiple dimensions comprises:
   determining that the corresponding member of each of multiple dimensions is not stored locally; and
   requesting the corresponding member of each of multiple dimensions from a backend system.

3. A method according to claim 1, where the corresponding member of each of multiple dimensions is presented simultaneously with the measure value.

4. A method according to claim 1, further comprising:
   in response to the first user input,
      determining that one of the corresponding member of the multiple dimensions is a child member of a dimension member hierarchy; and
      determining a drill-path of the one corresponding member,
   wherein storing the one measure value and the corresponding member of each of multiple dimensions comprises storing the one measure value, the corresponding member of each of multiple dimensions, and the drill-path.

5. A method according to claim 4, further comprising:
   in response to the first user input, determining a format based on the second application, and
   wherein storing the one measure value and the corresponding member of each of multiple dimensions comprises storing the one measure value, the corresponding member of each of multiple dimensions, and the drill-path in the determined format.

6. A method according to claim 4, wherein writing the stored one measure value and corresponding member of each of multiple dimensions to the second application comprises writing the stored one measure value, the corresponding member of each of multiple dimensions, and the drill-path to the second application.

7. A non-transitory medium storing processor-executable program code, the program code executable by a processor of a computing device to:
   present one or more measure values, each of the one or more measure values corresponding to a member of each of multiple dimensions;
   receive, by a first application, a first user input to transfer one of the one or more measure values including context information associated with the one measure value to a second application, wherein the second application is designated by the first user input and the context information includes members of multiple dimensions associated with the one measure value;
   in response to the first user input, determine a format based on the second application and store the one measure value and a corresponding member of each of multiple dimensions in a local clipboard memory in the determined format, wherein the first application and the second application are heterogeneous applications with different formats and wherein the local clipboard memory is shared among the first application and the second application;
   receive, by the first application, a second user input to paste the stored one measure value including the context information associated with the one measure value to the second application; and
   in response to the second user input, write the stored one measure value and corresponding member of each of multiple dimensions from the local clipboard memory to the second application.

8. A medium according to claim 7, wherein storage of the one measure value and a corresponding member of each of multiple dimensions comprises:
   determination that the corresponding member of each of multiple dimensions is not stored locally; and
   request of the corresponding member of each of multiple dimensions from a backend system.

9. A medium according to claim 7, where the corresponding member of each of multiple dimensions is presented simultaneously with the measure value.

10. A medium according to claim 7, the program code further executable by a processor of a computing device to:
    in response to the first user input,
       determine that one of the corresponding member of the multiple dimensions is a child member of a dimension member hierarchy; and
       determine a drill-path of the one corresponding member,
    wherein storage of the one measure value and the corresponding member of each of multiple dimensions comprises storage of the one measure value, the corresponding member of each of multiple dimensions, and the drill-path.

11. A medium according to claim 10, the program code further executable by a processor of a computing device to:
    in response to the first user input, determine a format based on the second application, and
    wherein storage of the one measure value and the corresponding member of each of multiple dimensions comprises storage of the one measure value, the corresponding member of each of multiple dimensions, and the drill-path in the determined format.

12. A medium according to claim 10, wherein writing of the stored one measure value and corresponding member of each of multiple dimensions to the second application comprises writing of the stored one measure value, the corresponding member of each of multiple dimensions, and the drill-path to the second application.

13. A system comprising:
    a display;
    a clipboard memory;
    a memory storing processor-executable program code; and a processor to execute the processor-executable program code in order to cause the computing device to:

present one or more measure values on the display, each of the one or more measure values corresponding to a member of each of multiple dimensions;

receive, by a first application, a first user input to transfer one of the one or more measure values including context information associated with the one measure value to a second application, wherein the second application is designated by the first user input and the context information includes members of multiple dimensions associated with the one measure value;

in response to the first user input, determine a format based on the second application and store the one measure value and a corresponding member of each of multiple dimensions in the clipboard memory in the determined format, wherein the first application and the second application are heterogeneous applications with different formats and wherein the clipboard memory is shared among the first application and the second application;

receive, by the first application, a second user input to paste the stored one measure value including the context information associated with the one measure value to the second application; and in response to the second user input, write the stored one measure value and the corresponding member of each of multiple dimensions from the clipboard memory to the second application.

14. A system according to claim 13, the processor to further execute the processor-executable program code in order to cause the computing device to:

in response to the first user input,
    determine that one of the corresponding member of the multiple dimensions is a child member of a dimension member hierarchy; and
    determine a drill-path of the one corresponding member,
wherein storage of the one measure value and the corresponding member of each of multiple dimensions comprises storage of the one measure value, the corresponding member of each of multiple dimensions, and the drill-path.

15. A system according to claim 14, where the corresponding member of each of multiple dimensions is presented simultaneously with the measure value.

* * * * *